(12) United States Patent
Bertilsson

(10) Patent No.: US 6,286,312 B1
(45) Date of Patent: Sep. 11, 2001

(54) ARRANGEMENT FOR A COMBUSTION ENGINE

(75) Inventor: Bert-Inge Bertilsson, Floda (SE)

(73) Assignee: Volvo Lastvagnar AB (SE)

( * ) Notice: Subject to any disclaimer, the term of this patent is extended or adjusted under 35 U.S.C. 154(b) by 0 days.

(21) Appl. No.: 09/554,986

(22) PCT Filed: Dec. 1, 1998

(86) PCT No.: PCT/SE98/02185

§ 371 Date: May 23, 2000

§ 102(e) Date: May 23, 2000

(87) PCT Pub. No.: WO99/31373

PCT Pub. Date: Jun. 24, 1999

(30) Foreign Application Priority Data

Dec. 3, 1997 (SE) .................................................. 9704489

(51) Int. Cl.[7] .................................................. F02B 37/013
(52) U.S. Cl. ............... 60/605.2; 60/624; 123/568.12; 123/559.2; 123/568.2; 123/568.21
(58) Field of Search ........................ 123/568.12, 568.2, 123/568.21, 559.2, 562; 60/605.2, 624

(56) References Cited

U.S. PATENT DOCUMENTS

| 4,803,969 | * | 2/1989 | Hiereth et al. ................. 123/561 |
| 5,131,229 | * | 7/1992 | Kriegler et al. ............... 60/605.2 |
| 5,138,840 | * | 8/1992 | Oguchi et al. .................. 60/624 |
| 5,142,868 |   | 9/1992 | Woon et al. ..................... 60/624 |
| 5,222,355 |   | 6/1993 | Karlsson et al. ................. 60/624 |
| 5,794,445 | * | 8/1998 | Dungner ......................... 60/605.2 |
| 6,050,094 | * | 4/2000 | Udd et al. ....................... 60/605.2 |
| 6,148,616 | * | 11/2000 | Yoshida et al. ................. 60/605.2 |

FOREIGN PATENT DOCUMENTS

| 8270454 | 10/1996 | (JP) . |
| 9601583 | 10/1997 | (SE) . |

* cited by examiner

Primary Examiner—Erick Solis
(74) Attorney, Agent, or Firm—Lerner, David, Littenberg, Krumholz & Mentlik, LLP

(57) ABSTRACT

Internal combustion engines are described including a crankshaft and at least one cylinder, an intake line for supplying air to the cylinder, an exhaust line for discharging exhaust gases from the cylinder, a recirculation line for recirculating at least a portion of the exhaust gases from the exhaust line to the intake line in order to reduce emissions from the engine, a valve in the recirculation line for controlling the flow of a portion of the exhaust gases therethrough, a turbocharger including a first turbocharging unit for absorbing energy from the exhaust gases and including a compressor to compress air supply to the intake line, and a second turbocharger unit disposed downstream of the first turbocharger unit for absorbing energy from the exhaust gases whereby a pressure is created in the exhaust line which is greater than the pressure in the intake line, and a power transmission line for transmitting power from the second turbocharger unit to the crankshaft. Methods for reducing emissions from internal combustion engines are also disclosed.

11 Claims, 1 Drawing Sheet

ARRANGEMENT FOR A COMBUSTION ENGINE

FIELD OF THE INVENTION

The present invention relates to apparatus for an internal combustion engine. More particularly, the present invention relates to reducing harmful emissions from a diesel engine provided with a system for recirculation of exhaust gases to the intake of the engine, a so called EGR system ("Exhaust Gas Recirculation"). The present invention also relates to a method for use in an internal combustion engine.

BACKGROUND OF THE INVENTION

In connection with load-carrying vehicles powered by a diesel engine, there exists a general need for reducing, as much as possible, the emission of harmful pollutants from the engine exhaust gases. These emissions are primarily nitrogen oxide compounds ($NO_x$), carbon monoxide (CO) and hydrocarbons (HC). In order to reduce these emissions, various measures can be taken. For example, it is known that the design of the combustion chamber in the engine cylinder and the process of injecting the engine fuel can be adjusted so as to minimize these emissions. In those cases where the engine is equipped with a turbocharger, the emission of $NO_x$ compounds may be reduced by cooling the air fed into the engine (known as "intercooling").

In connection with gasoline driven engines, the exhaust gases are normally purified by means of a catalytic converter located in the exhaust system. Because a diesel engine is operated with an air surplus, however, the three-way catalyst cannot be used for the reduction of $NO_x$ compounds from a diesel engine.

Due to increasing environmental requirements and the expected demands of future legislation, the need for reducing the emissions, primarily of $NO_x$ compounds, from diesel engines has grown ever stronger. In this context, it is known that the amount of $NO_x$ compounds from a diesel engine can be reduced by equipping it with something known as an EGR system (Exhaust Gas Recirculation), by means of which a certain amount of exhaust gases can be returned from the engine exhaust to its intake. The amount of $NO_x$ compounds generated in a diesel engine is principally exponentially proportional to the temperature inside the combustion chamber, and, by using an EGR system, the local temperature during combustion can be lowered by dilution with exhaust gases ($CO_2$ and $H_2O$). This in turn leads to less creation of $NO_x$.

A diesel engine may be provided with an EGR system by connecting a separate line between the ordinary exhaust outlet of the engine and a point close to the fresh air intake of the engine. In this line, a controllable valve can be arranged, which is also connected to a control unit. In dependence of the existing engine operating conditions, particularly its rotational speed and load, the control unit will determine the degree of opening of the valve, i.e. the amount of EGR gases to be recirculated to the engine air intake. A certain amount of EGR gases will then be fed from the engine exhaust side to its intake side, by means of the fact that the exhaust side pressure is normally higher than the intake side pressure, thus creating a natural "propulsion pressure" for the EGR gases.

In those cases where a diesel engine having an EGR system is utilized together with a turbocharger unit, a problem will thus be created by the fact that for most of the operating points, a higher pressure exists after the turbocharger compressor (i.e. at the point of the engine intake manifold where the incoming fresh air is fed to the engine) than at the engine exhaust outlet. This, in turn, means that a recirculation of EGR gases will not be possible, as there will not be any natural propulsion pressure from the engine exhaust to its intake side. In this manner, no EGR gas flow can be injected into the engine.

In accordance with the prior art, this problem can be solved by providing the turbocharger with variable turbine geometry. One arrangement using this solution is shown in Japanese Patent Application No. 08270454 A, disclosing a diesel engine having a turbocharger comprising adjustable guide vanes, which, depending on the engine operating conditions, can be adjusted to a certain position by means of a control unit. In this way, a sufficiently high pressure can be created on the engine exhaust side whereby a required amount of EGR gases can be recirculated to the intake side.

A substantial disadvantage of this known apparatus relates to the fact that it will entail an impaired gas exchange in the engine. Consequently, there is a need for engine arrangements providing a flow of EGR gases without impaired gas exchange in a diesel engine equipped with a turbocharger.

An object of the present invention is to provide an improved arrangement for an internal combustion engine, particularly a diesel engine equipped with an EGR system and a turbocharger, and providing an adequate propulsion pressure for the EGR gases, so as to achieve a reduction of the $NO_x$ emissions of the engine.

SUMMARY OF THE INVENTION

In accordance with the present invention, this and other objects have now been realized by the invention of an internal combustion engine comprising a crankshaft and at least one cylinder, an intake line for supplying air to the at least one cylinder, an exhaust line for discharging exhaust gases from the at least one cylinder, a recirculation line for recirculating at least a portion of the exhaust gases from the exhaust line to the intake line for reducing emissions from the internal combustion engine, a valve disposed in the recirculation line for controlling the flow of the at least a portion of the exhaust gases therethrough, a turbocharger associated with the exhaust line including a first turbocharger unit for absorbing energy from the exhaust gases and including compressing means for compressing air supplied to the intake line, and a second turbocharger unit disposed downstream of the first turbocharger unit for absorbing energy from the exhaust gases, whereby a pressure is created in the exhaust line which is greater than the pressure in the intake line, and power transmission means for transmitting power from the second turbocharger unit to the crankshaft. Preferably, the internal combustion engine comprises a diesel engine.

In accordance with one embodiment of the internal combustion engine of the present invention, the engine includes a cooler associated with the recirculation line for cooling the exhaust gases recirculated to the intake line.

In accordance with another embodiment of the internal combustion engine of the present invention, the first turbocharger unit and the second turbocharger unit comprise turbines powered by the exhaust gases.

In accordance with another embodiment of the internal combustion engine of the present invention, the valve comprises an electronically controlled valve, whereby the valve can be continuously controlled between an open condition and a closed condition.

In accordance with another embodiment of the internal combustion engine of the present invention, the valve comprises a first valve, and the engine includes a second valve disposed in the recirculation line, whereby each of the first and second valves can control the flow of the at least a portion of the exhaust gases therethrough, the first and second valves being independently controllable, whereby a plurality of valve positions can be obtained in a stepwise manner.

In accordance with another embodiment of the internal combustion engine of the present invention, the recirculation line is connected to the exhaust line at a point upstream of the first turbocharger unit.

In accordance with another embodiment of the internal combustion engine of the present invention, the at least one cylinder includes a pair of intake valves for supplying air thereto.

In accordance with the present invention, a method has also been discovered for reducing emissions from an internal combustion engine including a crankshaft, at least one cylinder, an exhaust line, and an air intake line, the method comprising absorbing energy from the exhaust gases created by the internal combustion engine at a first location in the exhaust line, compressing air supplied to the internal combustion engine through the air intake line, recirculating at least a portion of the exhaust gases created by the internal combustion engine to the at least one cylinder, controlling the amount of the exhaust gases recirculated to the at least one cylinder by means of a valve, further absorbing energy from the exhaust gases created by the internal combustion engine at a second location in the exhaust line downstream of the first location, whereby a pressure is created in the exhaust line which is greater than the pressure in the air intake line, and transmitting the energy absorbed at the second location to the crankshaft. Preferably, the method includes cooling the recirculating exhaust gas.

In accordance with one embodiment of the method of the present invention, the internal combustion engine comprises a diesel engine.

The apparatus according to the present invention is intended for an internal combustion engine having at least one cylinder, an intake for the provision of air, an exhaust outlet for discharging exhaust gases, a further line for recirculation of exhaust gases from the outlet to the intake for reduction of harmful emissions from the engine (in the form of CO and NO$_x$ and HC compounds), a controllable valve arranged in the further line and a turbocharger unit comprising a first means for absorbing energy from the exhaust gases and a means for compressing air to the intake. The present invention comprises a second means for absorbing energy from the exhaust gases, arranged downstream of the first means, for building a pressure in the outlet which surmounts the pressure in the intake.

According to a preferred embodiment of the present invention, the engine can be equipped with an EGR system and a system for further extraction of energy from the exhaust gases and feedback of that energy to the engine crankshaft. In this way it is ensured that the required propulsion pressure is built up on the engine exhaust side without deterioration of the engine efficiency, as an impaired gas exchange will be compensated for by the extraction of further energy from the exhaust gases and feeding it back to the crankshaft.

BRIEF DESCRIPTION OF THE DRAWING

The present invention will be explained in greater detail in the following detailed description, which refers to a preferred embodiment and the enclosed drawing, which in a side, elevational, schematic representation of an arrangement according to the present invention.

DETAILED DESCRIPTION

Figure 1:
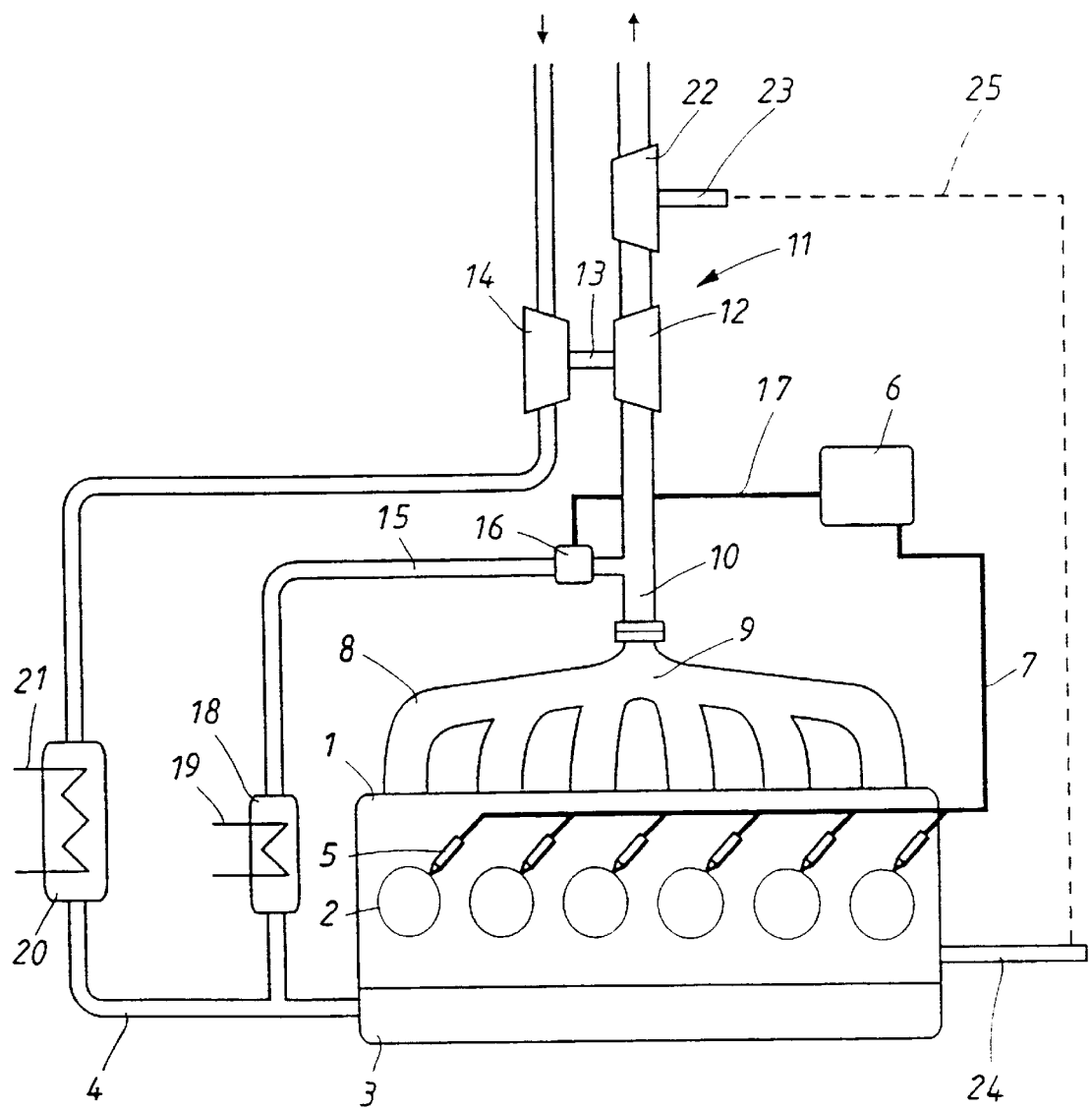

Referring to the drawing, FIG. 1 schematically illustrates apparatus according to the present invention, which can be utilized particularly for an internal combustion engine of the diesel type. According to a preferred embodiment, the diesel engine 1 is intended for use in a load-carrying vehicle, and comprises six cylinders 2. The present invention is, however, not limited to any specific number of cylinders or any specific cylinder configuration.

In a previously known manner, the engine 1 is equipped with an intake manifold 3, to which air is fed from the atmosphere through an intake conduit 4. The input air is then divided between the various cylinders 2. Furthermore, fuel is supplied to the cylinders 2 by a corresponding number of fuel injection devices 5 that are each connected to a central control unit 6 by means of an electrical connection 7. The control unit 6, which is preferably computer based, is, in a known manner, operative to control each fuel injection device 5 so as to supply, in each instant, an appropriate fuel/air mixture to the engine 1.

During operation of the engine 1, the control unit 6 is operative to control the respective injection device 5 in such a way that the fuel/air mixture supplied to the engine 1 will be adapted, in each instant, to the current operating conditions. The fuel supply is obtained in a generally known manner, i.e. dependent upon a multitude of parameters representative of the operating conditions of the engine 1 and the vehicle in question. For example, the control can be performed depending on the present throttle position and the rotational speed and load of the engine 1.

Each cylinder 2 is provided with an exhaust outlet 8. Together, the exhaust outlets 8 converge into an exhaust manifold 9, continuing into an exhaust pipe 10. This exhaust pipe runs with a turbocharger unit 11, which is substantially conventional. Thus, the turbocharger unit 11 comprises a means for absorbing energy from the exhaust gases in the form of a turbine 12, which is arranged in the exhaust pipe 10 and is rotated by the exhaust gases flowing through the exhaust pipe 10. As an alternative to the embodiment shown in the figure, which is designed in such a way that the exhaust outlets 8 join into a single exhaust pipe 10 (known as a "single inlet"), the exhaust outlets may be grouped into two groups, making the exhaust duct consist of two pipes leading to the turbine 12 (known as a "twin inlet").

The turbine 12 is arranged on a shaft 13, on which a compressor 14 is also arranged. The energy absorbed from the exhaust flow by the turbine 12 is thereby transferred to the compressor 14, which functions to compress the in-flowing air to the intake conduit 4 of the engine 1. In this manner, an increased amount of fuel may be fed to the engine 1, and its power output can thus be increased.

The engine 1 is further equipped with an arrangement for recirculation of a certain amount of exhaust gases to the intake side of the engine 1. As was discussed in the introduction, an EGR system ("Exhaust Gas Recirculation") is previously known. According to FIG. 1, a further line in the form of an EGR line 15 is therefore connected to the exhaust pipe 9, at a point upstream of the turbine 12. The EGR line 15 ends in the intake conduit 4, at a point upstream of the intake manifold 3 of the engine 1. Along the EGR line 15, a controllable valve 16 is arranged, connected to the control unit 6 by means of a further connection 17. As will be discussed in greater detail below, the control unit 6 is operative, in dependence of the present operating conditions, to adjust the valve 16 to a closed, open or partially open position. Depending on the position of the valve 16, a corresponding amount of exhaust gases will thus be recirculated to the intake manifold 3 by means of the EGR line. Through the recirculation of these EGR gases to the intake manifold 3, a temperature reduction during combustion is achieved in the respective cylinder 2, whereby the $NO_x$ generation in the cylinder 2 is reduced.

The $NO_x$ generation in the respective cylinder 2 is temperature-dependent and for this reason it is desirable to lower, as far as possible, the temperature of the gases (i.e. including air and recirculated EGR gases) entering the engine 1. For this reason, the EGR line 15 is provided with a cooler 18 functioning to cool the EGR gases recirculated to the intake manifold 3. To this end the cooler 18 includes a loop 19 through which a suitable coolant is circulated. Preferably, this coolant is the ordinary coolant for the engine 1, but air may also be used for this cooling. By means of cooler 18, the EGR gases can be cooled, which further contributes to reducing the generated amount of $NO_x$ compounds.

The intake conduit 4 is equipped with another cooler 21, (known as an "intercooler"), which is used for cooling the compressed air supplied by the compressor 14. This also contributes to a reduction in the amount of $NO_x$ compounds generated in the engine 1. The second cooler 20 is preferably arranged for cooling by air, which is schematically indicated by reference numeral 21.

According to the present invention, a second turbine 22 is used to absorb energy from the exhaust gases. The exhaust gases leaving the engine 1 and being passed through the first turbine 12 are thus also fed through the second turbine 22, which is then caused to rotate. For this purpose, the second turbine 22 is rotatably arranged on a further shaft 23. After having transferred part of their energy to the second turbine 22, the exhaust gases are conducted out to the atmosphere, preferably by way of a silencer (not shown).

Furthermore, the second turbine 22 is connected to the output crankshaft 24 of the engine 1, by means of a power transmission 25, not shown in any detail, which in the figure is schematically indicated by a dashed line. The power transmission 25 is preferably of a mechanical type, including a gear transmission connecting the shaft 23 to the crankshaft 24. The power transmission is moreover provided with a gear reduction for conversion of the rotational speed of the second turbine 22 to a rotational speed suitable for the crankshaft 24. In this manner, power is transferred between the second turbine 22 and the crankshaft 24, i.e. a certain amount of energy in the combustion gases can be regained from the exhaust flow and be used as additional power to the crankshaft 24.

A system for an engine having a turbocharger unit arranged for extraction of a certain amount of energy from the exhaust gases and feeding this energy back to the engine crankshaft is normally called a "turbo compound" system. By using, according to the present invention, the two turbines, 12 and 22, that are arranged in series, a pressure is achieved, during operation of the engine 1, on the exhaust side of the engine 1, which is higher than the pressure on its intake side. In this way, a sufficient propulsion pressure is obtained for recirculation of EGR gases to the intake manifold 3, without deterioration of the efficiency of the engine 1. In this manner, part of the energy contained in the exhaust gases is utilized as additional power to the crankshaft 24 instead of being conducted out into the atmosphere and thus being lost.

As has been explained above, the present invention includes a controllable valve 16, in connection with the control unit 6. Depending on the current operating conditions of the engine 1 and the vehicle in general, the valve 16 is used in such a manner that a certain amount of exhaust gases from the respective exhaust outlets 8 of the engine 1 are passed back to the intake manifold 3. According to a preferred embodiment hereof, the valve 16 consists of an electronically controlled valve, which, by means of the control unit 6, can be controlled continuously between an open and a closed position. By means of a particular setting of the aperture area of the valve 16 in the EGR line 15, a correspondingly sized flow of EGR gases to the intake manifold 3 is thus obtained.

For control of the valve 16, the control unit 6 is arranged for determination of the rotational speed and load (torque) of the engine, and for calculation, depending on these parameters, of the desirable amount of EGR gases to be recirculated to the intake manifold. This amount of EGR gases is preferably determined in the control unit 6 by using a stored table giving the required amount of EGR gases as a function of the speed and load. Depending on the calculated value of the amount of EGR gases, the valve 16 is adjusted to a corresponding position through a signal from the control unit 6.

In connection with recirculation of EGR gases, the recirculated amount has to be adapted concerning predetermined limit levels for soot and carbon monoxide released with the exhaust gases. As the EGR recirculation reduces the amount of air available at the engine intake, it must be ascertained that the amount of air is sufficient with regard to these limit levels.

By virtue of the valve 16 discussed above, which can be continuously adjusted to a desired position, a very large variation of the aperture area of the valve 16 is allowed between different extremes in the operating conditions of the engine 1. For the arrangement according to this embodiment, where energy is transferred from the second turbine 22 to the crankshaft 24, this large variation is required, as the pressure differential between the exhaust side and the intake side varies to a high degree as a function of the engine load. As a comparison it can be mentioned that this pressure differential varies considerably more than by previously known systems comprising turbocharger units with variable turbine geometry. By means of the control according to the present invention of the valve 16, a correct flow of EGR gases can be ascertained, which is substantially independent of the operating conditions of the engine 1.

Besides control of the valve 16 as a function of the speed and load of the engine 1, the control unit 6 may also be functional to control the valve 16 in dependence of other parameters. For example, transients can be taken into account to avoid unwanted puffs of smoke in the engine 1 exhausts.

Moreover, the control unit 6 also functions to allow control of the injection timing of the respective injection devices 5, substantially independently of the prevailing speed and load. For control of the valve 16, the main objective is that the flow of EGR gas is adjusted for an optimum reduction of $NO_x$ emissions. Then the injection point in time required to achieve minimum fuel consumption is determined, however, without exceeding the given NOlevel. Thus, the injection time is set to as early as possible, as this will lower, in a known manner, the fuel consumption of the engine 1. Furthermore the larger the provided flow of EGR gases, the earlier lies the possible injection time for a given $NO_x$ level.

According to a preferred embodiment hereof, each cylinder 2 of the engine 1 is provided with two intake valves (not shown), through which air and EGR gases are sucked in. The reason for this is that the engine 1 according to the present invention needs just as large an air/fuel relationship as an engine without EGR recirculation, in order to obtain good combustion without large amounts of smoke exhausted from the engine 1. This, in turn, requires that a larger gas flow (i.e. the input fresh air together with the EGR gases) has to be sucked into the engine 1. In order not to impair the flow properties and to increase the pressure drop across the engine 1 it is, by the present invention, an advantage to provide the engine 1 with two intake valves per cylinder 2, e.g. two relatively small intake valves instead of one, relatively large, intake valve. It is also an advantage from a point of view of strength to use two smaller valves instead of one large valve.

The present invention is not limited to the embodiment described above, but can be varied within the scope of the appended claims. For example, the valve 16 may be of the type operating according to an on/off control principle, i.e. that can be set only to an open or a closed position.

As an alternative to the electronically controlled valve 16 described above, the valve may be comprised of a pneumatically controlled valve. In such a case, the control unit 6 may be arranged to activate an electrical solenoid valve (not shown) (known as a PWM valve), operative to allow air to pass from a source of compressed air (not shown) when activated. By means of this compressed air, the valve can be activated so as to assume a required position.

Instead of using a single controllable EGR valve 16, two or more such controllable valves may be used, according to an alternative embodiment hereof. For example, the exhaust outlets 8 may be divided into two groups of three outlets each, whereby two pipes will lead to the turbine 12, instead of designing the exhaust outlets 8 to join into one single exhaust pipe 10 (compare the figure). If two such groups are used, exhaust gases are fed through each of these groups (from three cylinders each) to an exhaust pipe provided with an EGR valve. Further, the control unit is operative to control the two EGR valves independently of each other. To further enhance the function in case the two EGR valves are comprised of valves operated by on/off control, they may consist of one relatively small EGR valve and one relatively large EGR valve. In this way, three different conditions are defined, depending on whether or not each valve is closed or open. In dependence of which valves are activated by the control unit, three different levels of EGR gases fed from the engine are obtained.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. An internal combustion engine comprising a crankshaft and at least one cylinder, an intake line for supplying air to said at least one cylinder, an exhaust line for discharging exhaust gases from said at least one cylinder, a recirculation line for recirculating at least a portion of said exhaust gases from said exhaust line to said intake line for reducing emissions from said internal combustion engine, a valve disposed in said recirculation line for controlling the flow of said at least a portion of said exhaust gases therethrough, a turbocharger associated with said exhaust line including a first turbocharger unit for absorbing energy from said exhaust gases and including compressing means for compressing air supplied to said intake line, and a second turbocharger unit disposed downstream of said first turbocharger unit for absorbing energy from said exhaust gases, whereby a pressure is created in said exhaust line which is greater than the pressure in said intake line, and power transmission means for transmitting power from said second turbocharger unit to said crankshaft.

2. The internal combustion engine of claim 1 wherein said internal combustion engine comprises a diesel engine.

3. The internal combustion engine of claim 1 including a cooler associated with said recirculation line for cooling said exhaust gases recirculated to said intake line.

4. The internal combustion engine of claim 1 wherein said first turbocharger unit and said second turbocharger unit comprise turbines powered by said exhaust gases.

5. The internal combustion engine of claim 1 wherein said valve comprises an electronically controlled valve, whereby said valve can be continuously controlled between an open condition and a closed condition.

6. The internal combustion engine of claim 1 wherein said valve comprises a first valve, and including a second valve disposed in said recirculation line, whereby each of said first and second valves can control the flow of said at least a portion of said exhaust gases therethrough, said first and second valves being independently controllable, whereby a plurality of valve positions can be obtained in a stepwise manner.

7. The internal combustion engine of claim 1 wherein said recirculation line is connected to said exhaust line at a point upstream of said first turbocharger unit.

8. The internal combustion engine of claim 1 wherein said at least one cylinder includes a pair of intake valves for supplying air thereto.

9. A method for reducing emissions from an internal combustion engine including a crankshaft, at least one cylinder, an exhaust line, and an air intake line, said method comprising absorbing energy from the exhaust gases created by said internal combustion engine at a first location in said exhaust line, compressing air supplied to said internal combustion engine through said air intake line, recirculating at least a portion of said exhaust gases created by said internal combustion engine to said at least one cylinder, controlling the amount of said exhaust gases recirculated to said at least one cylinder by means of a valve, further absorbing energy from said exhaust gases created by said internal combustion engine at a second location in said exhaust line downstream of said first location, whereby a pressure is created in said exhaust line which is greater than the pressure in said air intake line, and transmitting said energy absorbed at said second location to said crankshaft.

10. The method of claim 9 including cooling said recirculating exhaust gas.

11. The method of claim 9 wherein said internal combustion engine comprises a diesel engine.

* * * * *